United States Patent [19]

Haeussermann

[11] 4,313,077
[45] Jan. 26, 1982

[54] MAGNETIC FIELD CONTROL

[75] Inventor: Walter Haeussermann, Huntsville, Ala.

[73] Assignee: The United States of America as represented by the Administrator of the National Aeronautics and Space Administration, Washington, D.C.

[21] Appl. No.: 111,436

[22] Filed: Jan. 11, 1980

[51] Int. Cl.³ .................. H02P 5/28; H02P 7/36; H02K 23/04; H02K 23/42
[52] U.S. Cl. .................. 318/806; 318/812; 318/830; 318/254
[58] Field of Search ............ 318/254 A, 830, 831, 318/832, 806, 812, 813

[56] References Cited

U.S. PATENT DOCUMENTS

| 3,767,986 | 10/1973 | Wada | 318/138 |
|---|---|---|---|
| 3,783,359 | 1/1974 | Malkiel | 318/254 |
| 3,855,509 | 12/1974 | Wright | 318/806 X |
| 3,896,357 | 7/1975 | Tanikoshi | 318/254 |
| 4,011,475 | 3/1977 | Schmider | 318/254 A X |
| 4,025,835 | 6/1977 | Wada | 318/254 A |
| 4,039,911 | 8/1977 | Tanikoshi | 318/254 A |
| 4,066,935 | 1/1978 | Takaoka et al. | 318/254 A X |
| 4,074,173 | 2/1978 | Janssen | 318/254 A X |
| 4,099,104 | 7/1978 | Muller | 318/254 A X |
| 4,119,895 | 10/1978 | Muller | 318/254 A |
| 4,190,793 | 2/1980 | Parker et al. | 318/812 X |

Primary Examiner—Gene Z. Rubinson
Assistant Examiner—Richard M. Moose
Attorney, Agent, or Firm—Leon D. Wofford; John R. Manning; Joseph H. Beumer

[57] ABSTRACT

A torque control for an electromechanical torquing device of a type wherein there occurs variable clearance between a rotor and field. A Hall effect device senses the field present, which would vary as a function of spacing between field and rotor, and the output of the Hall effect device controls the power applied to the field so as to provide a well-defined field and thus a controlled torque to the rotor which is well-defined.

4 Claims, 3 Drawing Figures

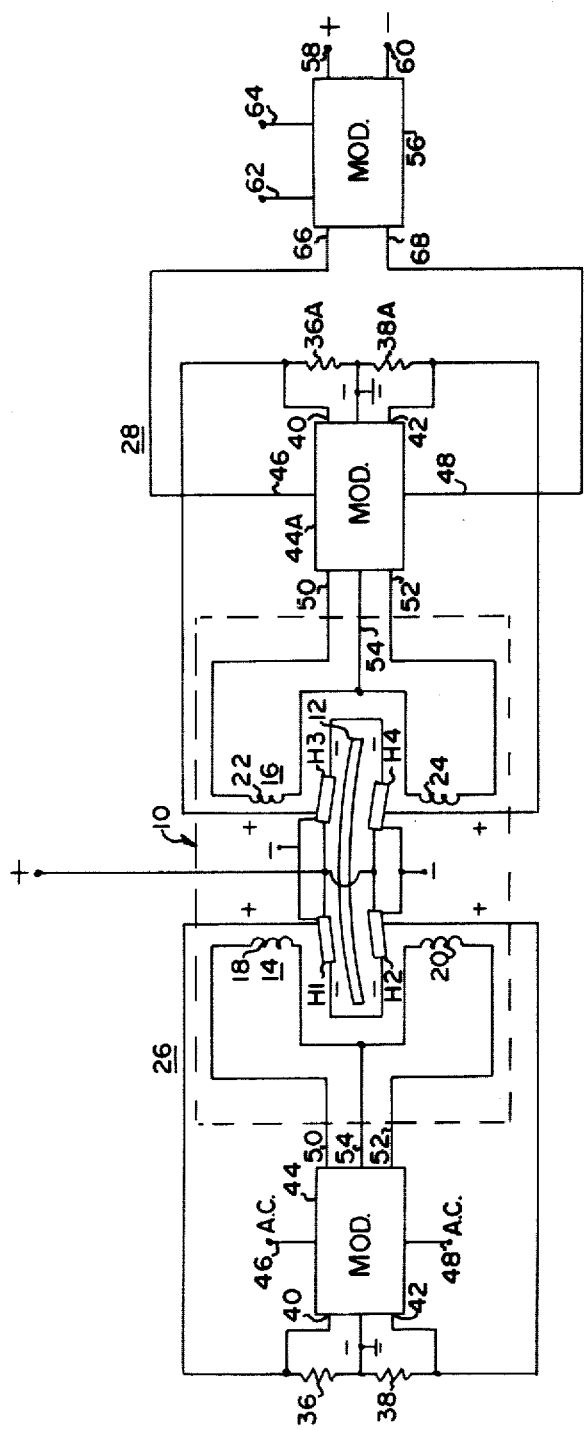
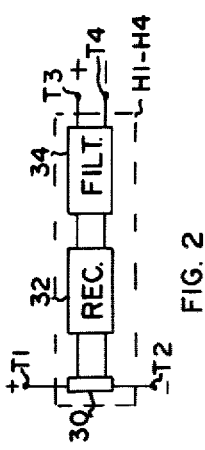
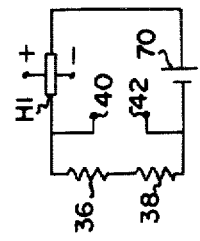

MAGNETIC FIELD CONTROL

The invention described herein was made by an employee of the United States Government and may be manufactured and used by or for the Government of the United States for governmental purposes without the payment of any royalties thereon or therefor.

DESCRIPTION

Technical Field

This invention relates to electromechanical converters, and particularly to devices of this character in which there is a requirement that a constant field be present to react with a rotor despite variations in distance between field and rotor.

Background Art

In certain electrical energy-to-torque converters, there may exist, normally by design, the possibility that spacing between a stationary magnetic field member and rotor driven by that field will vary. This, in turn, will produce a variation in the field reacting on the rotor, and thus variations in torque applied to the rotor. As one example, there has been developed a rotatable, magnetically supported mount for a spacecraft antenna wherein the mount is attached to and supported by a rotor of a motor drive, and wherein the rotor and the mount may be pointed over a small angle, e.g., 0.75°, as permitted by a system of the magnetic suspension. As a result, there is effected a variation in the gap between the field coils of the motor drive and motor by as much as ¼ inch. At the same time, there exists a requirement that the rotational control connected by the motor be very precise, which requires that a well defined, gap-independent control torque be applied to the motor despite the spacing variations In an effort to accomplish this, proximity devices have been employed to measure the distance between field coils and the rotor, and the outputs of these proximity devices employed to effect the control power input to the field coils. This has proven to be difficult to accomplish with existing proxmity detectors.

Statement of Invention

In accordance with this invention, a Hall effect generator is positioned in the gap between a field coil and rotor of an electromechanical torquing device, e.g., an induction motor, of the class where there is likely to occur a variation in the dimensions of the gap. The Hall effect device then senses the flux applied by the coil to the rotor, and an output signal from the Hall effect device is used as a control signal to control the power applied to the coil as a direct function of a flux change.

BRIEF DESCRIPTION OF THE DRAWINGS

FIG. 1 is a schematic illustration of an embodiment of the invention.

FIG. 2 is a detailed schematic illustration of one of the circuit elements shown in FIG. 1.

FIG. 3 is a schematic illustration of a circuit modification enabling employment of the invention where field coils are located only external to a rotor.

DETAILED DESCRIPTION OF THE INVENTION

Referring to FIG. 1, there is shown a magnetic torque drive, as stator unit 10, for driving an annular iron rotor 12 as employed in an A.C. induction type motor, or other like magnetic drive system. Drive unit 10 consists of two sets of like torque drive coil assemblies 14 and 16. First drive coil assembly 14 consists of coil 18 positioned on the outside of rotor 12, and coil 20 is oppositely positioned on the inside of rotor 12. Second drive coil assembly 16 is spaced around rotor 12 from assembly 14, and by the combination of the two, torque is applied to rotor 12. Drive coil assembly 16 consists of outer and inner coils 22 and 24. Rotor 12 is suspended in such a manner (not shown) that it may radially move or be moved, varying its spacing between the outer and inner coils of the drive assemblies. Such variation will, as discussed above, effect a variation in magnetic coupling between the coils and rotor, and thus for a given power input level to the coils produce, undesirably, varied torque. To compensate for this, and to effect a constant drive of the rotor, control circuits 26 and 28 are provided. Control circuit 26 utilizes as control elements Hall effect units H1 and H2, and control circuit 28 similarly utilizes Hall effect units H3 and H4, positioned as shown between stators and rotor. As the term Hall effect unit is used, it includes, as shown in FIG. 2, a Hall effect generator 30, a rectifier 32, and a filter 34. A D.C. bias source is impressed across terminals T1 and T2 of Hall effect generator 30, and it provides an output which varies in amplitude with applied magnetic flux. The output of generator 30 is rectified in rectifier 32 and filtered in filter 34 to thus provide a D.C. output on terminals T3 and T4 which is representative of the amplitude of applied flux. In the present case, the Hall effect generators sense the magnetic fields acting on rotor 12 and are used as a signal basis for effecting control power to the field coils.

Referring to FIG. 1, D.C. output voltages of Hall effect units H1 and H2 are connected in polarity opposition across resistors 36 and 38 and across input terminals 40 and 42 of modulator 44. An A.C. power input is applied to modulator 44 across terminals 46 and 48. The output of modulator 44, modulated by the Hall effect unit inputs, appears as two outputs, one between terminals 50 and 54, and one between terminals 52 and 54. With equal outputs from Hall effect units H1 and H2, their input to modulator 44 is zero; and in this posture, modulator 44 is adapted to provide equal outputs on terminals 50 and 52. When the output of the Hall effect units differ, their sum becomes a discrete voltage value and, depending upon which provides the higher output, the polarity of input to modulator 44 is of one polarity or the other. When of one polarity, the output on terminal 50 exceeds that of the output on terminal 52; and when of the other polarity, the output on terminal 52 exceeds that on terminal 50. The magnitude of difference varies directly with the magnitude of difference between the outputs of Hall effect units H1 and H2. In the present case, with a higher output of Hall effect unit H1, the output voltage on terminal 52 is made higher than that on terminal 50. As shown, with equal flux being sensed by Hall effect units H1 and H2, these would provide equal output voltages, and the voltage across resistors 36 and 38 and appearing at input terminals 40 and 42 of modulator 44 would be zero. This would represent the case where rotor 12 was midway between coils 18 and 20, and thus requiring no differential drive potential as between them in order to maintain a constant torque drive to rotor 12.

Assume now that rotor 12 moves upward, wherein it is closer to coil 18 than to coil 20. As a result, the flux level detected by Hall effect unit H1 will increase, and that detected by Hall effect unit H2 will decrease. As a result, the output of Hall effect unit H1 will be greater than that of Hall effect unit H2. Then, assuming that the outputs from Hall effect units H1 and H2 are polarized as shown, and Hall effect unit H1 provides a higher output than Hall effect unit H2, current will flow through resistors 36 and 38 to provide a positive voltage at upper input, terminal 40, with respect to terminal 42 (and also ground). The magnitude of this voltage is dependent upon the difference in outputs of Hall effect units H1 and H2. As a result of the difference, modulator 44 provides a lower alternating current output at terminal 50 with respect to ground and a higher output at terminal 52 with respect to ground. As a result, the input to coil 18 will decrease, and the input to coil 20 will increase until the detected flux levels sensed by Hall effect units H1 and H2 become equal. When this state of the circuit is reached, the inputs to and outputs from modulator 44 will remain constant so long as the spacing of rotor 12 with respect to coils 18 and 20 remains the same. If the spacing between coils 18 and 20 changes, as, for example, back to an even spacing of the rotor between the coils, the Hall effect units will again equalize in output, and the input circuit will be balanced, and the outputs to coil 18 and 20 would be made identical. If the spacing between rotor 12 and coil 18 decreases, and the spacing between coil 20 and rotor 12 increases, a reverse action will occur, with a negative voltage on terminal 40 with respect to terminal 42; and the greater voltage will be supplied to coil 18 and a lesser voltage to coil 20 until the flux drive on opposite sides equalizes.

Except as will be noted, control circuit 28 is identical to control circuit 26, and like components bear the same numeral with the subscript "A". They function in the same manner to control energization of coils 22 and 24. In this circuit, Hall effect units H3 and H4 are connected across resistors 36A and 38A to effect control of modulator 44A, which then controls coils 22 and 24 as described above for the control of modulator 44 of inputs to coils 18 and 20.

Control circuit 28 differs from control circuit 26 in that it provides means of applying a control level of A.C. to modulator 44A to enable the torque applied to rotor 12 to be selectively controlled. Thus, modulator 56, to which a torque control input signal is applied at terminals 58 and 60, modulates a reference A.C. power input, applied at terminals 62 and 64, to provide at output terminals 66 and 68 a signal output then applied to input terminals 46 and 48 of modulator 44A which are responsive to the control signal applied to terminals 58 and 60. Thus, by the circuitry shown, there is provided a system whereby an induction motor is controlled in torque to eliminate torque errors arising out of a variation in gap between motor coils and rotor, and at the same time is controllable as to torque.

Where drive coils are only employed on one side of a rotor, as, for example, by the omission of coils 20 and 24, as shown in FIG. 1, Hall effect units H2 and H4 would be omitted, and a bias source 70, as illustrated in FIG. 3, would be included in place of an omitted Hall effect unit. Source 70 would be a D.C. source having an output voltage equal to the output of a Hall effect unit, e.g., H1 as shown, when rotor 12 is properly positioned in the center of the gap in which it is to run.

While there has been shown one means of translating a flux detection signal to power signal, namely, a modulator, it is to be appreciated that various types of signal controlled, power controls may be employed, such as SCR and triac type controls now being widely employed.

Although the Hall effect units as a circuit, as shown in FIG. 2, are schematically illustrated as being positioned within the gap between rotor 12 and a coil of FIG. 1, in practice only a Hall effect generator 30 would be so located in the gap, rectifier 32 and filter 34 being located with the balance of the circuitry shown.

From the foregoing, it will be appreciated that by an exceedingly simple configuration, torque applications to a radially movable rotor may be maintained relatively gap independent. This is accomplished by directly sensing the field applied to the rotor. This eliminates the step of making a measurement of distance between the coil and rotor, and then relating this to a change in magnetic field, as required by prior art. In addition to providing a simpler system, it enables a more accurate and foolproof means of providing a uniform torque control, which is also more efficient than other control methods.

I claim:

1. An electromagnetic torquing device comprising:
    a fixed position electrical field and a rotor adapted to be rotated by a reaction between it and said field, and wherein:
    said electrical field comprises first and second coils on at least one side of said rotor, and
    the spacing between said rotor and coils is controllably varied;
    a first Hall effect generator positioned between said first coil and said rotor, and a second Hall effect generator positioned between said second coil and said rotor; and
    control means comprising:
        rectification means responsive to said Hall effect generators for providing a D.C. voltage, and
        modulation means responsive to an A.C. voltage and said D.C. voltage for energizing said coils at a level responsive to said spacing for producing a torque on said rotor independent of said spacing as said spacing is varied between selected values.

2. A torque control as set forth in claim 1 wherein:
    said electrical field comprises third and fourth coils, and said third coil being positioned on the opposite side of said rotor from said first coil, and said fourth coil being positioned on the opposite side of said rotor from said second coil;
    third and fourth Hall effect generators, said third Hall effect generator being positioned between said third coil and said rotor, and said fourth Hall effect generator being positioned between said fourth coil and said rotor; and
    said control means responsive to the outputs of said third and fourth Hall effect devices and coupled to said third and fourth coils for energizing said third and fourth coils and said first and second coils at levels to provide a gap independent torque application to said rotor despite variations in spacing between said rotor and said coils.

3. A torque control as set forth in claim 2 wherein:
    said control means includes:
        modulation means responsive to the outputs of said first and third Hall effect generators and to a source of alternating current for providing an alternating current drive to said first and third coils which are equal when the outputs of said first and third Hall effect generators are equal and when said outputs are unequal for providing an increase drive to one of said first and third coils and a decrease drive to the other which varies inversely with the output level of the Hall effect generator positioned between that coil and said rotor.

4. A torque control as set forth in claim 3 wherein said control means comprises:

second modulation means responsive to a control signal and an alternating current reference signal for providing as an output an alternating current signal which varies in amplitude in accordance with said control signal; and third modulation means responsive to the output of said second modulation means and said second and fourth Hall effect generators for providing alternating current drives to said second and fourth coils which are equal when the outputs of said second and fourth Hall effect generators are equal and when the outputs of said second and fourth Hall effect devices are unequal for providing increased drive to one of said second and fourth Hall effect generators and a decreased drive to the other of said second and fourth coils, which last-named drive is inversely with the output level of the Hall effect generator positioned between that coil and said rotor.

* * * * *